United States Patent [19]
Okura

[11] 4,272,175
[45] Jun. 9, 1981

[54] AUTOMATIC APERTURE CONTROL DEVICE

[75] Inventor: Zenichi Okura, Oomiya, Japan

[73] Assignee: Asahi Kogaku Kogyo Kabushiki Kaisha, Tokyo, Japan

[21] Appl. No.: 89,798

[22] Filed: Oct. 31, 1979

[30] Foreign Application Priority Data

Nov. 14, 1978 [JP] Japan .............................. 53-140001

[51] Int. Cl.³ ............................................. G03B 9/06
[52] U.S. Cl. .................................................. 354/274
[58] Field of Search .............. 354/270, 272, 274, 286, 354/40, 46, 47

[56] References Cited

U.S. PATENT DOCUMENTS

| | | | |
|---|---|---|---|
| 3,055,282 | 9/1962 | Baur et al. | 354/274 |
| 3,631,787 | 1/1972 | Shimizu | 354/274 |
| 3,668,995 | 6/1972 | Bardutzky | 354/274 |
| 3,687,047 | 8/1972 | Ito | 354/274 |

Primary Examiner—Donald A. Griffin
Attorney, Agent, or Firm—Sughrue, Rothwell, Mion, Zinn and Macpeak

[57] ABSTRACT

An automatic aperture control device adapted to be fitted in a lens barrel of an automatic aperture control camera in which the aperture value is controlled in accordance with the stop position of the camera. Pairs of aperture blades and intermediate levers are pivotally mounted on a support ring with a first drive shaft of each intermediate lever mounted in a corresponding aperture of an opening and closing ring and a second drive shaft of each intermediate levers slidably mounted in an elongated groove formed in a corresponding aperture plate. The elongated groove is formed such that the amount of variation of an outer radius of the aperture blade is minimized with a result that smooth and precise aperture control is achieved over the entire range of aperture values.

6 Claims, 8 Drawing Figures

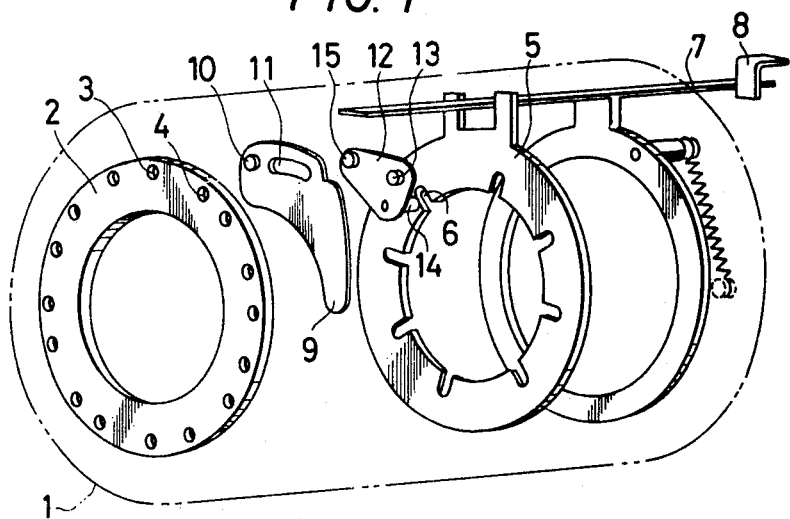
FIG. 1
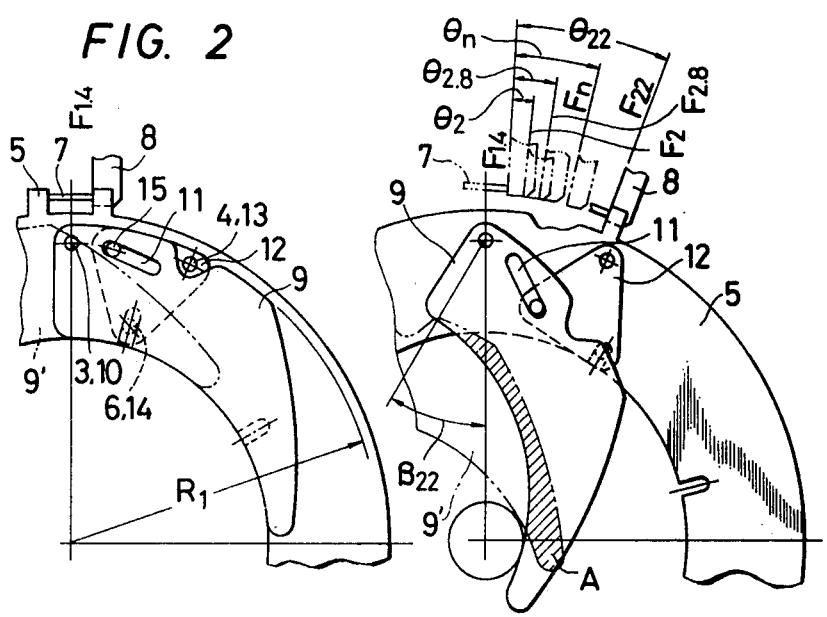
FIG. 2
FIG. 3

AUTOMATIC APERTURE CONTROL DEVICE

DESCRIPTION OF THE PRIOR ART

A camera and a lens having an exposure control which is capable of functioning in multiple modes such as aperture-priority, shutter-priority and auto-flashing modes has been proposed in which the operator can select any desired exposure control mode. In a conventional camera and lens, the camera's shutter speed is controlled in accordance with a selected lens aperture value in the aperture-priority mode. On the other hand, in the shutter-priority mode, aperture value information, which is controlled according to the camera shutter speed setting, is transmitted to the lens according to the stop position of the camera's automatic control member. In general, the automatic aperture operation range of a conventional camera and lens is sufficiently large that the aperture value can be readily and accurately controlled.

However, in a conventional camera and lens employing an aperture-priority mode, the automatic aperture operation range is, in general, small. The range of operation of an automatic aperture control member of the lens directly corresponds to the degree of variation of the aperture diameter. More precisely, for small aperture values, the amount of movement between adjacent stops is quite small so that great precision is required to exactly set in a desired aperture value. Therefore, if such a lens is used to control the aperture value according to the stop position of the camera's automatic aperture control member, then for the smaller aperture values variations in the setting of the automatic aperture control member are reflected by inaccurcies in the actually realized aperture value.

Accordingly, an object of the invention is to provide an automatic aperture control device in which the above-described difficulties are eliminated without changing the small automatic aperture operation range of the conventional camera.

BRIEF DESCRIPTION OF THE DRAWINGS

FIG. 1 is a perspective view of an example of an automatic aperture control device according to the invention showing one of plural pairs of aperture blades and intermediate levers;

FIGS. 2 and 3 are front views of the device shown in FIG. 1 of which FIG. 2 shows the state of the device in which the aperture value is maximally open and FIG. 3 shows the state of the device with a minimum aperture value;

FIGS. 5 and 6 show an arrangement of a conventional automatic aperture control device of which FIG. 5 is a front view of essential components of the device and FIG. 6 is an enlarged view of a portion of the device.

SUMMARY OF THE INVENTION

Figure 4:
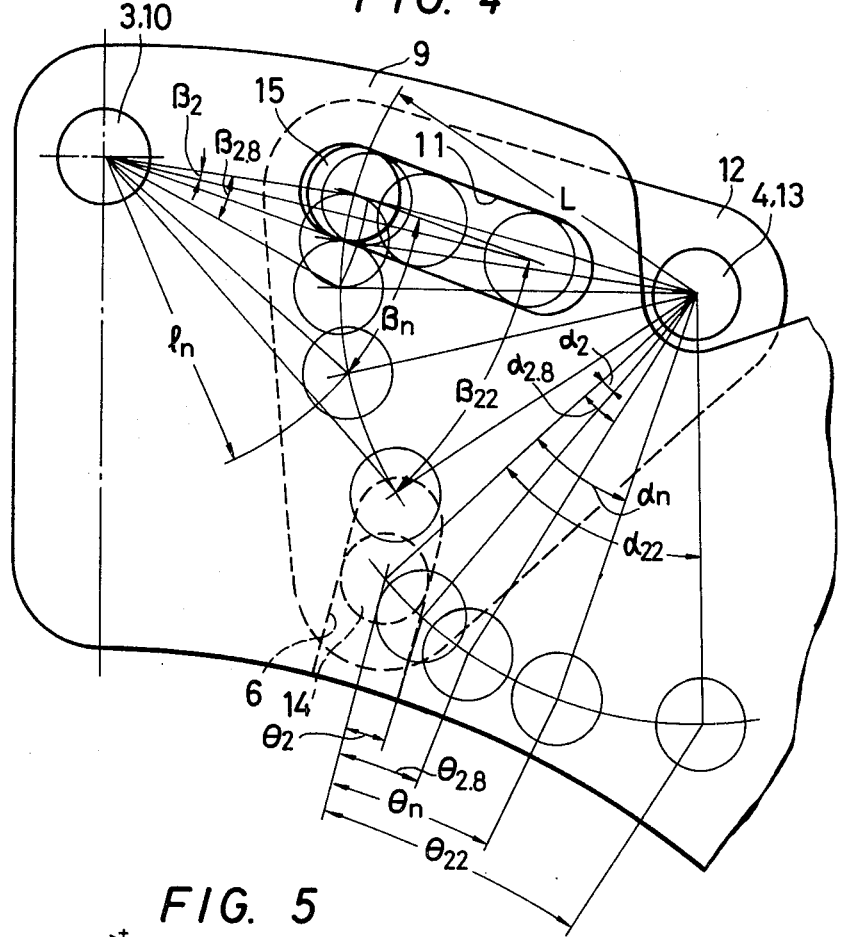
FIG. 4 is an enlarged view of a portion of the device showing the arrangement of the aperture blade and the intermediate lever.

This, as well as other objects of the invention, may be met by an automatic aperture control device adapted to be fitted into a lens barrel in which the aperture value is controlled in accordance with the stop position of an automatic aperture control member in a camera including pairs of aperture blades and intermediate levers pivotally mounted on a support ring, a first drive shaft fixedly secured to each intermediate lever operably coupled to an opening and closing lens turned by the automatic aperture control member of the camera, and a second drive shaft fixedly secured to each intermediate lever and slidably mounted in an elongated groove formed in each aperture blade to operate each aperture blade through corresponding ones of the intermediate levers.

The elongated groove is preferably formed such that the amount of variation of an outer radius of the aperture is minimized. A plurality of supporting shafts are provided, one for each aperture blade, fixedly secured to each of the aperture blades. In a preferred embodiment, the elongated groove is formed such that $l_n \cdot \sin \beta_n \approx L \cdot \sin \alpha_n$, where $l_n$ is the distance from the center of the supporting shaft to the center of the second shaft, $\beta_n$ the angle of rotation of an aperture blade at an aperture value of Fn relative to a maximally open aperture value, L is the distance between the centers of the first end second shafts, and $\alpha_n$ is the angle of rotation of the intermediate lever at the aperture value $F_n$ relative to a maximally open aperture value.

DETAILED DESCRIPTION OF THE PREFERRED EMBODIMENTS

An automatic aperture control device according to the invention will be described in detail with reference to the accompanying drawings.

An example of an automatic aperture control device according to the invention is shown in FIGS. 1 through 4. Each aperture blade 9 and each intermediate lever 12 have supporting shafts 10 and 13, respectively, fixedly secured thereto which are rotatably inserted into shaft holes 3 and 4 formed in a supporting ring 2 provided on the stationary portion of a lens barrel 1. The radius $R_1$ of a circle formed by the aperture blades is such that, as in ordinary aperture blades, the amount of overlap A(-shaded area in FIG. 3) between adjacent aperture blades 9 and 9' is maintained constant. A drive shaft 14 fixedly secured to the intermediate lever 12 is inserted into a groove 6 which is formed in an opening and closing ring 5 through which the operation of an automatic aperture control member 8 on the camera side of the control device is transmitted through an aperture control ring 7. Another drive shaft 15, fixedly secured to the intermediate lever 12, is inserted into an elongated groove 11 formed in the aperture blade 9 in such a manner that it is not in contact with the adjacent aperture blade 9'.

The elongated groove 11 of the aperture blade is shown in more detail in FIGS. 2 to 4. In FIG. 4, the stop positions of the automatic aperture control member 8 corresponding to the aperture values F2, F2.8, ... Fn ... and F22 controlled by the camera are designated by $\theta_2, \theta_{2.8}, \ldots \theta_n \ldots \theta_{22}$, respectively. The opening and closing ring 5, through which the rotational movement operating the automatic aperture control member 8 is transmitted by the aperture control ring 7, is rotated by an operational angle of $\theta_2, \theta_{2.8}, \ldots \theta_n \ldots$ or $\theta_{22}$, as a result of which the intermediate lever 12 is rotated through an angle $\alpha_2, \alpha_{2.8} \ldots \alpha_n \ldots$ or $\alpha_{22}$. If the angles of rotation of the aperture blade 9 corresponding to the aperture values F2, F2.8 ..., Fn ... and F22 are represented by $\beta_2, \beta_{2.8}, \ldots \beta_n \ldots$ and $\beta_{22}$, respectively, as indicated in the figure, then the configuration of the elongated groove 11 is defined by the locus of movement of the drive shaft 15 as it is turned by the ring 5 through the entire range of angles $\beta_2, \beta_{2.8}, \ldots \beta_n \ldots$ and $\beta_{22}$ around the supporting shaft 10. By setting the distance between the shafts of the aperture blade 9 and the intermediate lever 12 so as to be $l_n \cdot \sin \beta_n \approx L \cdot \sin \alpha_n$ the configuration of the elongated groove 11 is such that the groove 11 is formed within an area defined by the radius R thereby reducing the amount of variation from the optical axis as shown in the figure.

Figure 7:
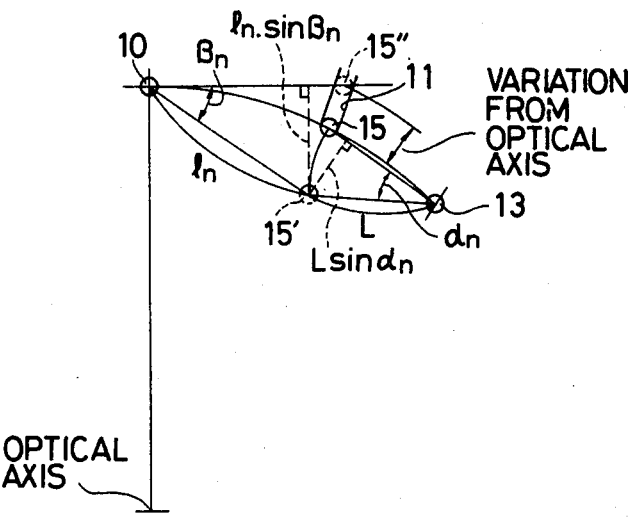
FIGS. 7 and 8 are sketches used in illustrating respectively the amount of variation from the optical axis for a guiding groove of the invention and of a conventional construction.

By setting the distance between the shafts 10, 13 and 15 so as to be $l_n \cdot \sin \beta_n \approx L \cdot \sin \alpha_n$, the outer diameter of the aperture blade is made substantially equal to that of the normal aperture blade so that the variation from the optical axis is quite small. To this effect, when the aperture blade 9 of the lens is moved from the fully-opened position corresponding to an aperture value F of 1.4 to an aperture value of Fn, the angle of rotation $\beta_n$ may be approximated by $\beta_n \approx k \cdot \sin f(Fn)$ where k is a constant determined by the configuration of the aperture blade to satisfy the relationship $l_n \cdot \sin \beta_n = L \cdot \sin \alpha_n$ and the elongated groove 11 is formed along a straight line connecting the shaft 10 to the shaft 15 as shown in FIG. 7. This figure illustrates that the variation from the optical axis is indeed quite small. Reference numeral 15 designates the position of shaft 15 at F1.4, 15' at Fn, and 15" the contacting position between the shaft 15 and the elongated groove 11 at Fn.

Figure 8:
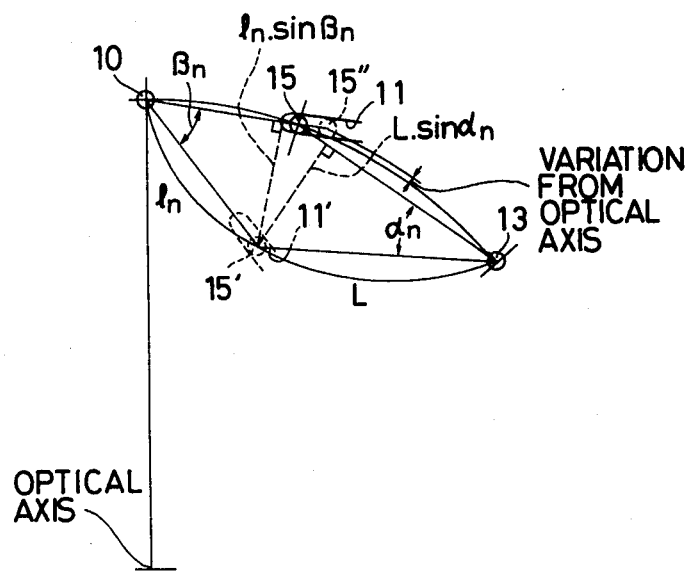

FIG. 8 illustrates a case in which $l_n \cdot \sin \beta_n$ is significantly different from $L \cdot \sin \alpha_n$. As is readily apparent, the variation from the optical axis becomes quite large.

Figure 5:
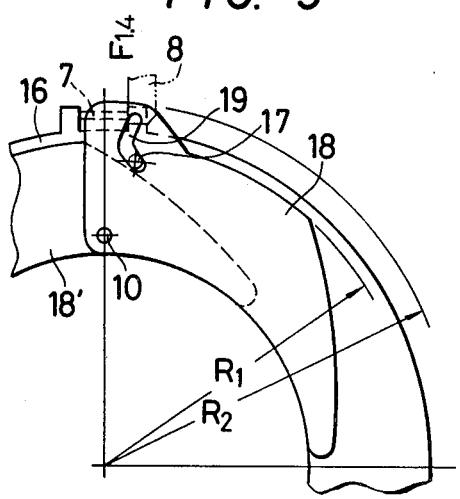
Figure 6:
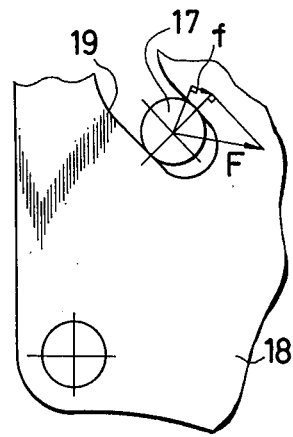

FIGS. 5 and 6 show a conventional automatic aperture control device for a lens whose automatic aperture operational range of movement is sufficiently large applied to a lens whose automatic aperture operational range is small as in the present invention. As in the case of ordinary aperture blade, each aperture blade 18 defines a circle having a radius $R_1$ and each is pivotally supported on the lens barrel with the aid of a supporting shaft 10. The stop position of an automatic aperture control ring 8 is transmitted through an aperture control ring 7 to an opening and closing ring 16. A drive shaft 17 is fixed to the ring 16 and extends into an elongated groove 19 formed in the aperture blade 18 in such a manner that the drive shaft 17 is not in contact with an adjacent aperture blade 18'. The resulting configuration of the elongated groove 19 is such that the amount of variation from the optical axis is large as illustrated in relation to the opening and closing ring 16 with respect to the aperture value and the transmission of the rotational movement of the aperture blade 18 to the drive shaft 17. Therefore, the radius $R_2$ of the aperture blade is larger than the radius $R_1$. When a torque F is applied to the drive shaft 17, the torque transmitted to the aperture blade 18 is reduced to a smaller torque f because of the presence of the elongated groove 19 as a result of which operation of the aperture blade 18 is not smooth.

As is apparent from the above description, according to the invention, it is possible to smooth out the variations in the operation of the automatic aperture control member by evenly dividing the conventional small automatic aperture operational amount by the number of steps of aperture values controlled whereby the amount of variation of the aperture control member for the minimum aperture value is increased with the result that the aperture value control by the camera can be readily and effectively achieved. Furthermore, the configuration of the elongated groove formed in the aperture blade can be so set that the amount of variation from the optical axis is small. Accordingly, the radius of an aperture blade used with the invention is equivalent to that of an ordinary aperture blade and the size of the lens barrel remains substantially the same.

The invention has been described with respect to the case in which the aperture value is controlled by the camera. The technical concept of the invention may also be applied to the situation where the automatic aperture control device is adjusted from the lens side. However, in that case, unsuitable variations in the operation of the opening and closing ring for the smaller aperture values are somewhat more prominent.

If the supporting ring is so designed that it can be turned with respect to the lens barrel, the invention can be applied to the automatic aperture control device in which, as in a zoom lens, aperture diameter correction is required.

What is claimed is:

1. An automatic aperture control device in a lens barrel in which the aperture value is controlled in accordance with the stop position of an automatic aperture control member in a camera comprising: pairs of aperture blades and intermediate levers pivotally mounted on a supporting ring, a first drive shaft fixedly secured to each intermediate lever operatively coupled to an opening and closing ring turned by said automatic aperture control member of said camera, and a second drive shaft fixedly secured to each intermediate lever slidably mounted in an elongated groove formed in each aperture blade to operate each aperture blade through each intermediate lever, said elongated groove shape defined by the locus of movement of said second drive shaft as it is actuated by said opening and closing ring to define a range of stop positions.

2. The aperture control device of claim 1 wherein said elongated groove is formed such that the amount of variation of an outer radius of said aperture blades is minimized.

3. The aperture control device of claim 1 further comprising a plurality of supporting shafts one of which is fixedly secured to each of said aperture blades.

4. The aperture control device of claim 3 wherein said elongated groove is formed such that $l_n \cdot \sin \beta_n$ is approximately equal to $L \cdot \sin \alpha_n$ where $l_n$ is the distance from the center of said supporting shaft to the center of said second shaft, $\beta_n$ is the angle of rotation of an aperture blade at an aperture value of Fn relative to a maximally open aperture value, L is the distance between the centers of said first and second shafts, and $\alpha_n$ is the angle of rotation of said intermediate lever at said aperture value Fn relative to a maximally open aperture value.

5. An automatic aperture control device in a lens barrel in which the aperture value is controlled in accordance with the stop position of an automatic aperture control member in a camera comprising: pairs of aperture blades and intermediate levers pivotally mounted on a supporting ring, a plurality of supporting shafts one of which is fixedly secured to each of said aperture blades, a first drive shaft fixedly secured to each intermediate lever operatively coupled to an opening and closing ring turned by said automatic aperture control member of said camera, a second drive shaft fixedly secured to each intermediate lever slidably mounted in an elongated groove formed in each aperture blade to operate each aperture blade through each intermediate lever, and said elongated groove is formed such that $l_n \cdot \sin \beta_n$ is approximately equal to $L \cdot \sin \alpha_n$ where $l_n$ is the distance from the center of said supporting shaft to the center of said second shaft, $\beta_n$ is the angle of rotation of an aperture blade at an aperture value of Fn relative to a maximally open aperture value, L is the distance between the centers of said first and second shafts, and $\alpha_n$ is the angle of rotation of said intermediate lever at said aperture value Fn relative to a maximally open aperture value.

6. The aperture control device of claim 5 wherein said elongated groove is formed such that the amount of variation of an outer radius of said aperture blade is minimized.

* * * * *